United States Patent
Burd

(10) Patent No.: US 10,935,236 B2
(45) Date of Patent: *Mar. 2, 2021

(54) NON-PLANAR COMBUSTOR LINER PANEL FOR A GAS TURBINE ENGINE COMBUSTOR

(71) Applicant: United Technologies Corporation, Farmington, CT (US)

(72) Inventor: Steven W. Burd, Cheshire, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 831 days.

This patent is subject to a terminal disclaimer.

(21) Appl. No.: 15/348,619

(22) Filed: Nov. 10, 2016

(65) Prior Publication Data

US 2018/0231249 A1 Aug. 16, 2018

(51) Int. Cl.
| | |
|---|---|
| *F23R 3/42* | (2006.01) |
| *F23R 3/06* | (2006.01) |
| *F23R 3/50* | (2006.01) |
| *F23M 5/02* | (2006.01) |
| *F23R 3/60* | (2006.01) |
| *F23M 5/04* | (2006.01) |
| *F23M 5/08* | (2006.01) |

(Continued)

(52) U.S. Cl.
CPC ............... *F23M 5/04* (2013.01); *F01D 9/023* (2013.01); *F23M 5/085* (2013.01); *F23R 3/002* (2013.01); *F23R 3/06* (2013.01); *F23R 3/50* (2013.01); *F23R 3/60* (2013.01); *F23R 2900/00005* (2013.01); *F23R 2900/03041* (2013.01); *F23R 2900/03042* (2013.01); *F23R 2900/03044* (2013.01); *Y02T 50/675* (2013.01)

(58) Field of Classification Search
CPC .. F23R 2900/00012; F23R 2900/00017; F23R 2900/03041; F23R 2900/03042; F23R 2900/03043; F23R 2900/03044; F23R 3/06; F23R 3/002

See application file for complete search history.

(56) References Cited

U.S. PATENT DOCUMENTS

| | | |
|---|---|---|
| 4,236,378 A | 12/1980 | Vogt |
| 4,302,941 A | 12/1981 | DuBell |
| 4,749,029 A | 6/1988 | Becker |

(Continued)

FOREIGN PATENT DOCUMENTS

| | | |
|---|---|---|
| DE | 102015205975 A1 | 10/2016 |
| EP | 1482246 A1 | 12/2004 |

(Continued)

OTHER PUBLICATIONS

European Search Report dated Mar. 6, 2018 for European Patent Application 17201191.8.

(Continued)

*Primary Examiner* — Steven M Sutherland
*Assistant Examiner* — Rodolphe Andre Chabreyrie
(74) *Attorney, Agent, or Firm* — Bachman & LaPointe, P.C.

(57) ABSTRACT

A combustor for a gas turbine engine including a liner panel mounted to a support shell via a multiple of studs, the liner panel including a forward section and an aft section that defines an arcuate surface section therebetween in the axial profile between the forward section and the aft section.

4 Claims, 6 Drawing Sheets

(51) Int. Cl.
*F01D 9/02* (2006.01)
*F23R 3/00* (2006.01)

(56) References Cited

U.S. PATENT DOCUMENTS

| | | | |
|---|---|---|---|
| 4,773,227 A * | 9/1988 | Chabis | F23R 3/002 60/752 |
| 5,357,744 A | 10/1994 | Czachor et al. | |
| 5,553,455 A | 9/1996 | Craig et al. | |
| 6,029,455 A | 2/2000 | Sandelis | |
| 6,101,814 A | 8/2000 | Hoke et al. | |
| 6,397,765 B1 | 6/2002 | Becker | |
| 6,532,929 B2 | 3/2003 | Antonevich et al. | |
| 6,568,079 B2 | 5/2003 | Farmer et al. | |
| 6,581,285 B2 | 6/2003 | Emilianowicz | |
| 6,612,248 B2 | 9/2003 | Becker | |
| 6,655,146 B2 | 12/2003 | Kutter et al. | |
| 6,675,582 B2 | 1/2004 | Monty et al. | |
| 6,868,675 B1 | 3/2005 | Kuhn et al. | |
| 6,931,855 B2 | 8/2005 | Glessner et al. | |
| 6,988,369 B2 | 1/2006 | Conete et al. | |
| 7,246,993 B2 | 7/2007 | Bolms et al. | |
| 7,363,763 B2 | 4/2008 | Coughlan, III et al. | |
| 7,524,167 B2 | 4/2009 | Ohri et al. | |
| 7,665,307 B2 * | 2/2010 | Burd | F23R 3/002 60/752 |
| 7,726,131 B2 | 6/2010 | Sze et al. | |
| 7,900,457 B2 | 3/2011 | Patterson et al. | |
| 8,015,817 B2 | 9/2011 | Charron et al. | |
| 8,015,829 B2 | 9/2011 | Coughlan, III et al. | |
| 8,069,670 B2 | 12/2011 | Schmahl et al. | |
| 8,141,370 B2 | 3/2012 | Bulman et al. | |
| 8,245,513 B2 | 8/2012 | Huth et al. | |
| 8,256,223 B2 | 9/2012 | Dierberger et al. | |
| 8,418,470 B2 | 4/2013 | Burd | |
| 8,505,306 B2 | 8/2013 | Dierberger et al. | |
| 8,984,896 B2 | 3/2015 | Davenport et al. | |
| 9,243,515 B2 | 1/2016 | McAlice et al. | |
| 9,249,732 B2 | 2/2016 | McAlice et al. | |
| 9,335,048 B2 | 5/2016 | Bagchi | |
| 9,404,391 B2 | 8/2016 | Brühwiler | |
| 9,410,702 B2 | 8/2016 | Dudebout et al. | |
| 9,423,129 B2 | 8/2016 | Graves et al. | |
| 9,482,432 B2 | 11/2016 | Cunha et al. | |
| 9,835,332 B2 | 12/2017 | Jopp et al. | |
| 2004/0182085 A1 | 9/2004 | Jeppel et al. | |
| 2007/0144178 A1 * | 6/2007 | Burd | F23R 3/002 60/753 |
| 2008/0010992 A1 | 1/2008 | Patterson et al. | |
| 2008/0104963 A1 | 5/2008 | Grote et al. | |
| 2009/0193813 A1 | 8/2009 | Garry et al. | |
| 2009/0199837 A1 | 8/2009 | Tschirren et al. | |
| 2010/0242486 A1 | 9/2010 | Jarmon et al. | |
| 2010/0251721 A1 | 10/2010 | Morrison et al. | |
| 2011/0027569 A1 | 2/2011 | Richards | |
| 2011/0030378 A1 | 2/2011 | Carlisle | |
| 2011/0113785 A1 * | 5/2011 | Tschuor | F01D 9/023 60/752 |
| 2011/0185737 A1 | 8/2011 | Dierberger et al. | |
| 2011/0185740 A1 | 8/2011 | Dierberger et al. | |
| 2011/0305582 A1 | 12/2011 | Lee et al. | |
| 2012/0144835 A1 | 6/2012 | Taylor et al. | |
| 2012/0198854 A1 | 8/2012 | Schilp et al. | |
| 2012/0210719 A1 | 8/2012 | Dierberger et al. | |
| 2012/0234402 A1 | 9/2012 | Richards | |
| 2012/0275900 A1 | 11/2012 | Snider et al. | |
| 2013/0019603 A1 | 1/2013 | Dierberger et al. | |
| 2013/0055722 A1 | 3/2013 | Verhiel et al. | |
| 2013/0192262 A1 * | 8/2013 | Eastwood | F23R 3/002 60/805 |
| 2014/0020393 A1 * | 1/2014 | Nakamata | F23R 3/002 60/754 |
| 2014/0096527 A1 | 4/2014 | Bangerter et al. | |
| 2015/0260401 A1 * | 9/2015 | Gerend S | F23R 3/002 60/752 |
| 2015/0260403 A1 | 9/2015 | Clemens et al. | |
| 2015/0330633 A1 | 11/2015 | Graves et al. | |
| 2015/0362191 A1 | 12/2015 | Papple et al. | |
| 2015/0362192 A1 | 12/2015 | Cunha et al. | |
| 2016/0054001 A1 | 2/2016 | Bangerter et al. | |
| 2016/0109129 A1 | 4/2016 | Rettig | |
| 2016/0186999 A1 | 6/2016 | Freeman et al. | |
| 2016/0195275 A1 | 7/2016 | Lyons et al. | |
| 2016/0258624 A1 | 9/2016 | Harding et al. | |
| 2016/0281988 A1 | 9/2016 | Tu, Jr. et al. | |
| 2017/0241643 A1 * | 8/2017 | Mulcaire | F23R 3/002 |
| 2018/0038593 A1 | 2/2018 | Quach et al. | |

FOREIGN PATENT DOCUMENTS

| | | |
|---|---|---|
| EP | 2846097 A2 | 3/2015 |
| EP | 2905538 A1 | 8/2015 |
| EP | 3040617 A1 | 7/2016 |
| EP | 3054218 A1 | 8/2016 |
| EP | 3279568 A1 | 2/2018 |
| GB | 2432902 A | 6/2007 |
| WO | 03006883 A1 | 1/2003 |
| WO | 2014169127 A1 | 10/2014 |
| WO | 2015031796 A1 | 3/2015 |
| WO | 2016156370 A1 | 10/2016 |

OTHER PUBLICATIONS

U.S. Office action dated Nov. 15, 2018 in corresponding U.S. Appl. No. 15/348,639.
U.S. Office action dated Nov. 15, 2018 in corresponding U.S. Appl. No. 15/348,679.
European Search Report dated Mar. 9, 2018 for European Patent Application No. 17201184.3.
European Search Report dated Mar. 27, 2018 for European Patent Application No. 17201138.9.
European Search Report dated Mar. 5, 2018 for European Patent Application 17201213.0.
U.S. Final Office Action dated Apr. 29, 2019 issued for U.S. Appl. No. 15/348,679.
European Office Action dated Feb. 28, 2019 issued for European Patent Application 17201184.3.
EP Final Office Action dated Jul. 16, 2019 issued in corresponding European Patent Application No. 17201138.9.
U.S. Final Office Action dated Mar. 16, 2020 issued in corresponding U.S. Appl. No. 15/348,679.

* cited by examiner

NON-PLANAR COMBUSTOR LINER PANEL FOR A GAS TURBINE ENGINE COMBUSTOR

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. The combustor section typically includes a combustion chamber formed by an inner and outer wall assembly. Each wall assembly includes a support shell lined with heat shields often referred to as liner panels. Combustor panels are often employed in modern annular gas turbine combustors to form the inner flow path. The panels are part of a two-wall liner and are exposed to a thermally challenging environment.

In typical combustor chamber designs, combustor Impingement Film-Cooled Floatwall (IFF) liner panels typically include a hot side exposed to the gas path. The opposite, or cold side, has features such as cast in threaded studs to mount the liner panel and a full perimeter rail that contact the inner surface of the liner shells.

The wall assemblies are segmented to accommodate growth of the panels in operation and for other considerations. Combustor panels typically have a quadrilateral projection (i.e. rectangular or trapezoid) when viewed from the hot surface. The panels have a straight edge that forms the front or upstream edge of the panel and a second straight edge that forms the back or downstream edge of the combustor. The panels also have side edges that are linear in profile.

The liner panels extend over an arc in a conical or cylindrical fashion in a plane and terminate in regions where the combustor geometry transitions, diverges, or converges. This may contribute to durability and flow path concerns where forward and aft panels merge or form interfaces. These areas can be prone to steps between panels, dead regions, cooling challenges and adverse local aerodynamics.

SUMMARY

A liner panel for use in a combustor of a gas turbine engine, the liner panel according to one disclosed non-limiting embodiment of the present disclosure can include a forward section and an aft section that defines the profile internal to the combustor with arcuate surface section between the forward section and the aft section.

A further embodiment of the present disclosure may include, wherein the arcuate surface section extends over an angle between about 150 to 175 degrees.

A further embodiment of the present disclosure may include, wherein the arcuate surface section is defined with respect to the cold side.

A further embodiment of the present disclosure may include, wherein the liner panel is a forward liner panel that is longer than an aft liner panel.

A combustor for a gas turbine engine according to one disclosed non-limiting embodiment of the present disclosure can a liner panel mounted to the support shell via a multiple of studs, the liner panel including a forward section and an aft section that that defines the profile internal to the combustor with arcuate surface section between the forward section and the aft section.

A further embodiment of the present disclosure may include, wherein the arcuate surface section extends over an angle between about 150 to 175 degrees.

A further embodiment of the present disclosure may include, wherein the arcuate surface section is defined with respect to the cold side.

A further embodiment of the present disclosure may include, wherein the liner panel is at least one of a forward liner panel, an aft liner panel, and a single panel A further embodiment of the present disclosure may include, wherein the support shell includes a complementary arcuate surface section adjacent to the arcuate surface.

A further embodiment of the present disclosure may include an aft liner panel mounted to the support shell via a multiple of studs downstream of the forward liner panel.

A further embodiment of the present disclosure may include an aft liner panel downstream of complementary bend.

A further embodiment of the present disclosure may include a forward assembly including a bulkhead support shell, a bulkhead assembly mounted to the bulkhead support shell, and a multiple of the combustor swirlers mounted at least partially through the bulkhead assembly.

A further embodiment of the present disclosure may include, wherein the forward assembly is mounted to the support shell.

A further embodiment of the present disclosure may include a multiple of circumferentially distributed bulkhead liner panels secured to the bulkhead support shell around a swirler opening.

A further embodiment of the present disclosure may include, wherein the liner panel is a forward liner panel.

A further embodiment of the present disclosure may include, wherein the support shell includes a complementary arcuate surface section adjacent to the arcuate surface.

A further embodiment of the present disclosure may include an aft liner panel mounted to the support shell via a multiple of studs downstream of the forward liner panel.

A further embodiment of the present disclosure may include, wherein the liner panel is a forward liner panel with an arcuate surface section that extends over an angle between about 150 to 175 degrees with respect to the cold side.

A combustor for a gas turbine engine according to one disclosed non-limiting embodiment of the present disclosure can include a support shell with a bend; a forward liner panel mounted to the support shell via a multiple of studs, the liner panel including a forward section and an aft section that defines the profile internal to the combustor with arcuate surface section between the forward section and the aft section adjacent to the bend; and an aft liner panel mounted to the support shell via a multiple of studs downstream of the forward liner panel.

A further embodiment of the present disclosure may include, wherein the liner panel is a forward liner panel with an arcuate surface section that extends over an angle between about 150 to 175 degrees with respect to the cold side.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
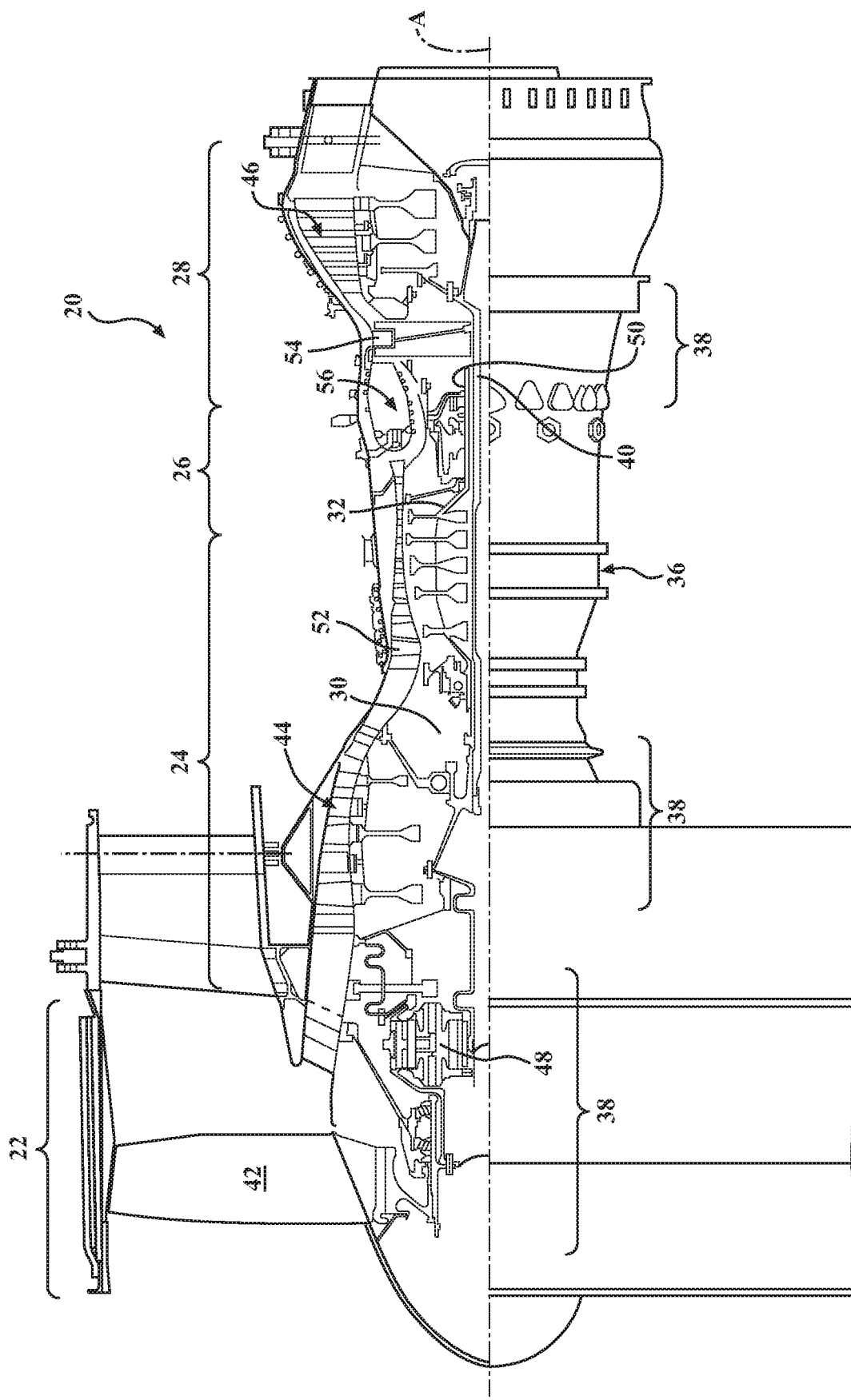
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures might include an augmentor section among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be appreciated that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44, then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet (10668 m). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 2:
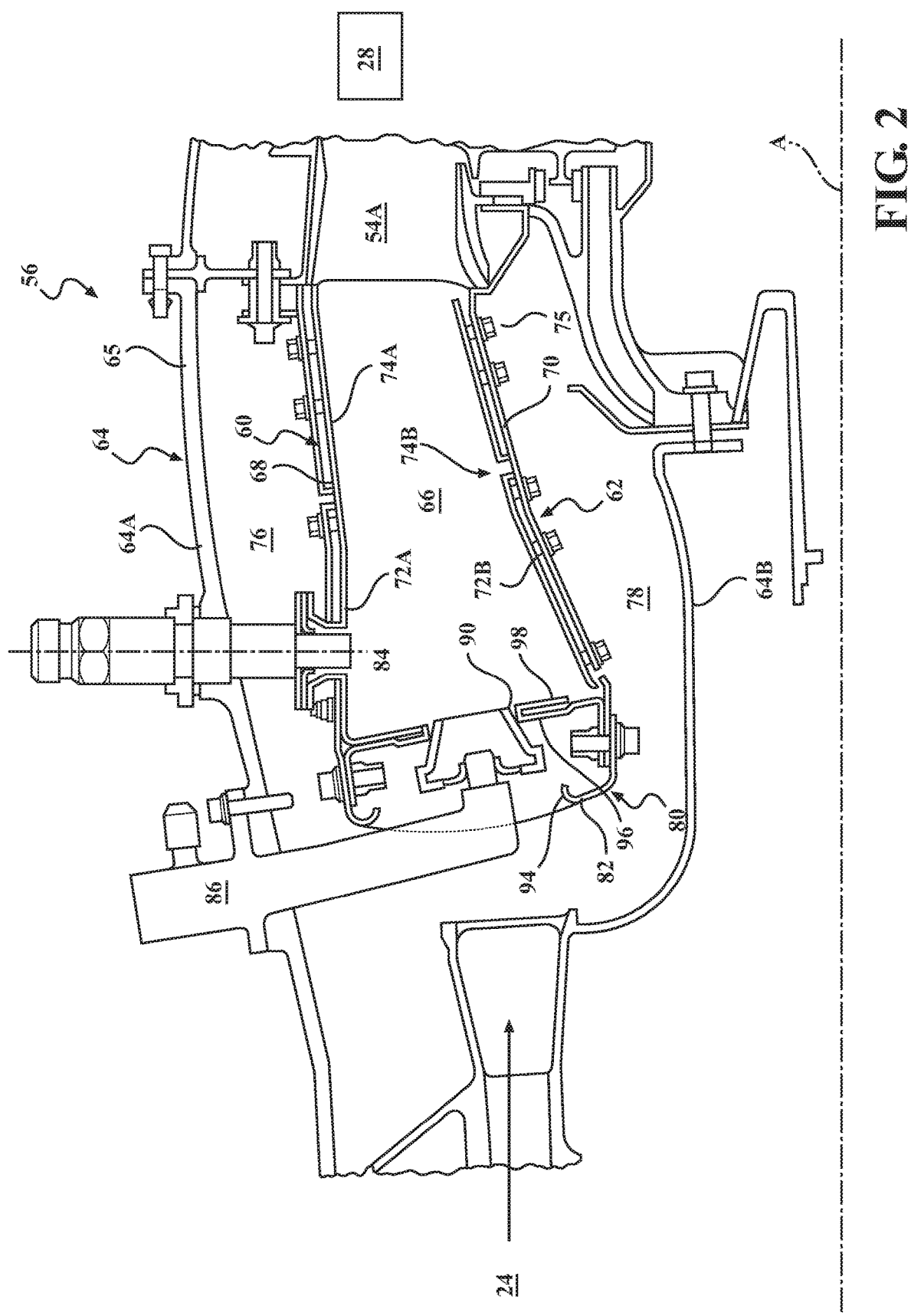
FIG. 2 is an expanded longitudinal schematic sectional view of a combustor section according to one non-limiting embodiment that may be used with the example gas turbine engine architectures.

With reference to FIG. 2, the combustor section 26 generally includes a combustor 56 with an outer combustor wall assembly 60, an inner combustor wall assembly 62, and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be appreciated that although a particular combustor is illustrated, other combustor types with various combustor liner arrangements will also benefit herefrom. It should be further appreciated that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forwardmost ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
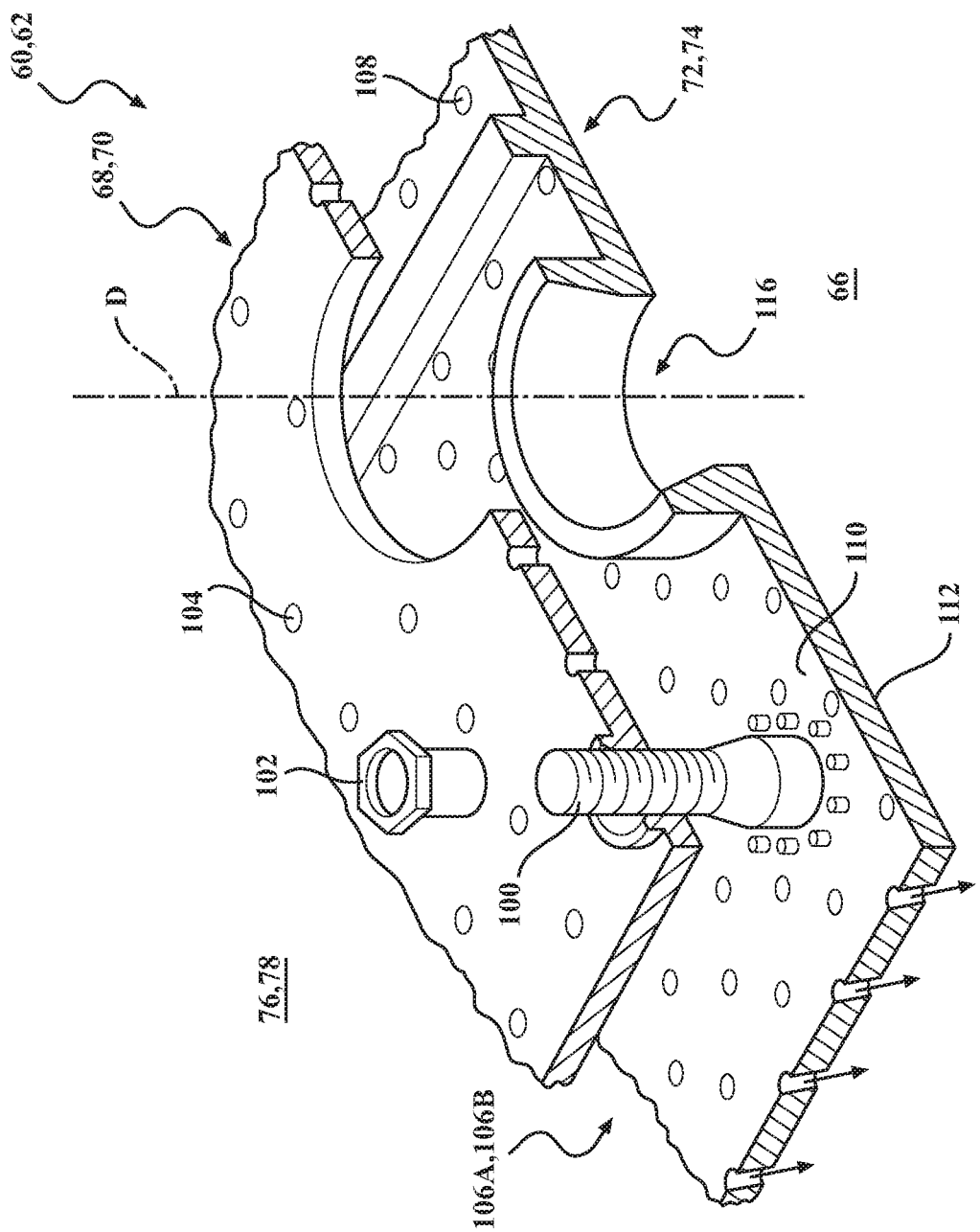
FIG. 3 is an exploded partial sectional view of a portion of a combustor wall assembly.

With reference to FIG. 3, a multiple of studs 100 extend from each of the liner panels 72, 74 so as to permit a liner array (partially shown in FIG. 4) of the liner panels 72, 74 to be mounted to their respective support shells 68, 70 with fasteners 102 such as nuts. That is, the studs 100 project rigidly from the liner panels 72, 74 to extend through the respective support shells 68, 70 and receive the fasteners 102 on a threaded section thereof (FIG. 5).

A multiple of cooling impingement passages 104 penetrate through the support shells 68, 70 to allow air from the respective annular plenums 76, 78 to enter cavities 106 formed in the combustor walls 60, 62 between the respective support shells 68, 70 and liner panels 72, 74. The impingement passages 104 are generally normal to the surface of the liner panels 72, 74. The air in the cavities 106 provides cold side impingement cooling of the liner panels 72, 74 that is generally defined herein as heat removal via internal convection.

A multiple of effusion passages 108 penetrate through each of the liner panels 72, 74. The geometry of the passages, e.g., diameter, shape, density, surface arcuate surface, incidence arcuate surface, etc., as well as the location of the passages with respect to the high temperature combustion flow also contributes to effusion cooling. The effusion passages 108 allow the air to pass from the cavities 106 defined in part by a cold side 110 of the liner panels 72, 74 to a hot side 112 of the liner panels 72, 74 and thereby facilitate the formation of a thin, relatively cool, film of cooling air along the hot side 112.

Figure 6:
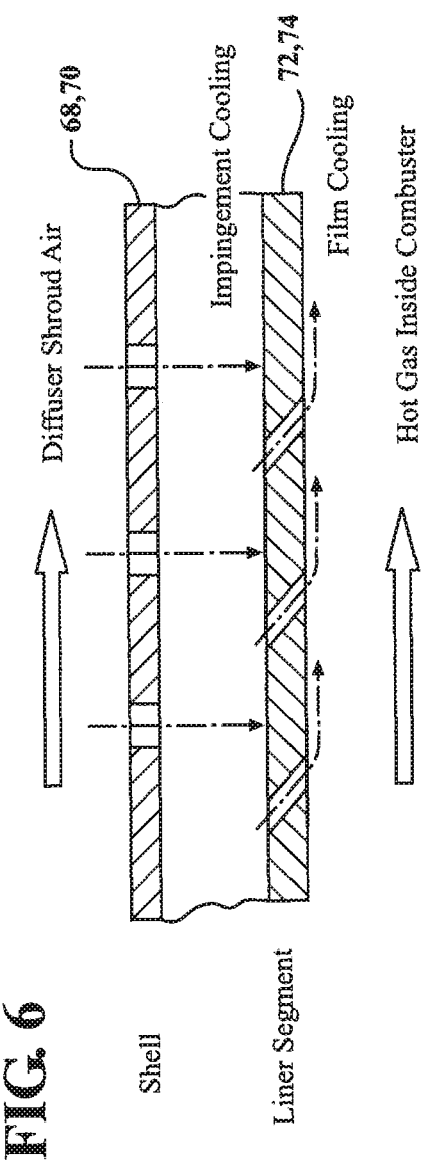
FIG. 6 is a sectional view of a portion of a combustor wall assembly.

In one disclosed non-limiting embodiment, each of the multiple of effusion passages 108 are typically 0.025" (0.635 mm) in diameter and define a surface arcuate surface section of about thirty (30) degrees with respect to the cold side 110 of the liner panels 72, 74. The effusion passages 108 are generally more numerous than the impingement passages 104 and promote film cooling along the hot side 112 to sheath the liner panels 72, 74 (FIG. 6). Film cooling as defined herein is the introduction of a relatively cooler air at one or more discrete locations along a surface exposed to a high temperature environment to protect that surface in the region of the air injection as well as downstream thereof.

The combination of impingement passages 104 and effusion passages 108 may be referred to as an Impingement Film Floatwall (IFF) assembly. A multiple of dilution passages 116 are located in the liner panels 72, 74 each along a common axis D. For example only, the dilution passages 116 are located in a circumferential line W (shown partially in FIG. 4). Although the dilution passages 116 are illustrated in the disclosed non-limiting embodiment as within the aft liner panels 72B, 74B, the dilution passages may alternatively be located in the forward liner panels 72A, 72B or in a single liner panel which replaces the fore/aft liner panel array. Further, the dilution passages 116 although illustrated in the disclosed non-limiting embodiment as integrally formed in the liner panels, it should be appreciated that the dilution passages 116 may be separate components. Whether integrally formed or separate components, the dilution passages 116 may be referred to as grommets.

Figure 4:
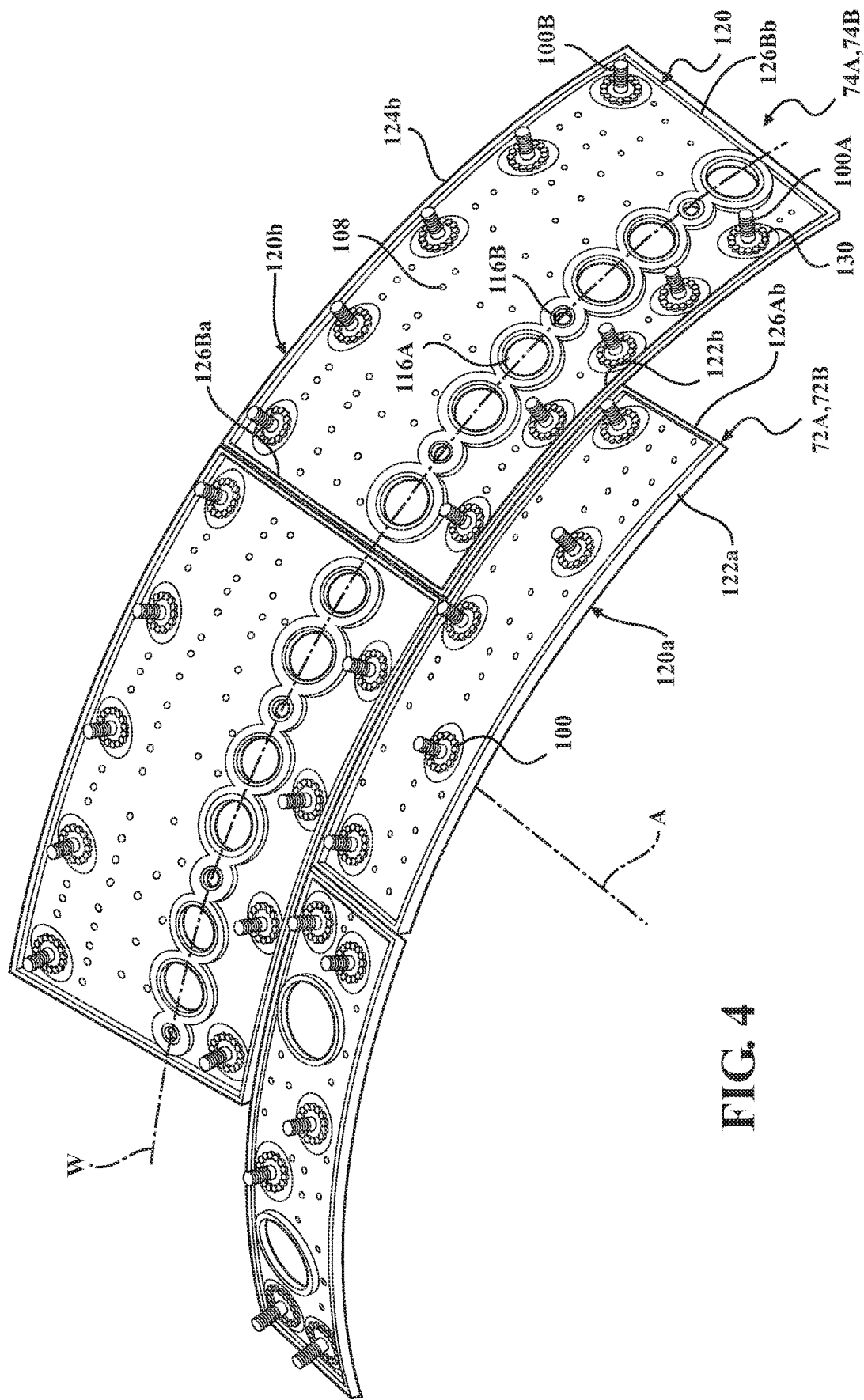
FIG. 4 is a perspective cold side view of a portion of a liner panel array.
Figure 5:
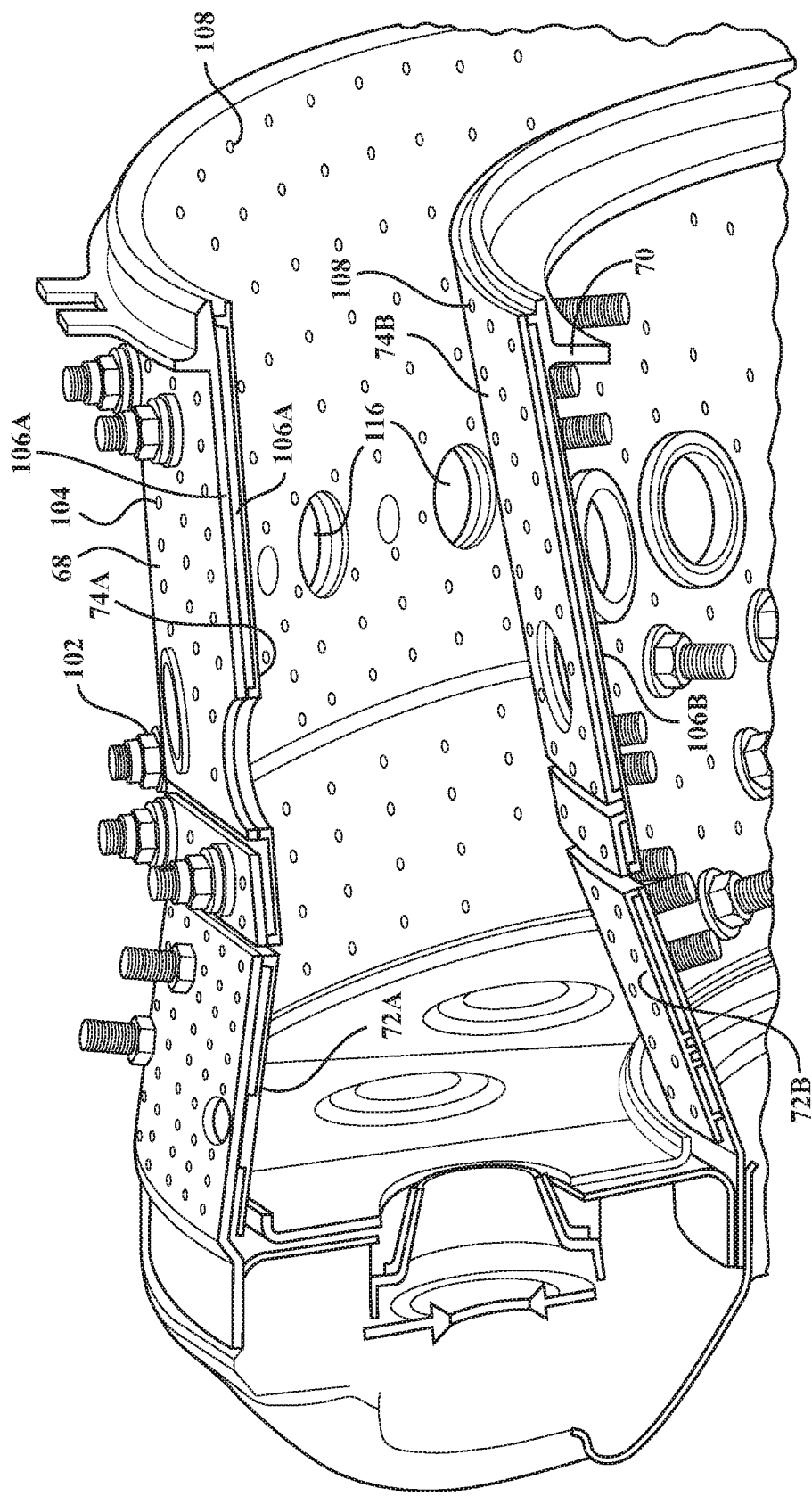
FIG. 5 is a perspective partial sectional view of a combustor.

With reference to FIG. 4, in one disclosed non-limiting embodiment, each of the forward liner panels 72A, 72B, and the aft liner panels 74A, 74B in the liner panel array includes a perimeter rail 120a, 120b formed by a forward circumferential rail 122a, 122b, an aft circumferential rail 124a, 124b, and axial rails 126Aa 126Ab, 126Ba, 126Bb, that interconnect the forward and aft circumferential rail 122a, 122b, 124a, 124b. The perimeter rail 120 seals each liner panel with respect to the respective support shell 68, 70 to form the impingement cavity 106 therebetween. That is, the forward and aft circumferential rail 122a, 122b, 124a, 124b are located at relatively constant curvature shell interfaces while the axial rails 126Aa 126Ab, 126Ba, 126Bb, extend across an axial length of the respective support shell 68, 70 to complete the perimeter rail 120a, 120b that seals the forward liner panels 72A, 72B, and the aft liner panels 74A, 74B to the respective support shell 68, 70.

A multiple of studs 100 are located adjacent to the respective forward and aft circumferential rail 122a, 122b, 124a, 124b. Each of the studs 100 may be at least partially surrounded by posts 130 to at least partially support the fastener 102 and provide a stand-off between each forward liner panels 72A, 72B, and the aft liner panels 74A, 74B and respective support shell 68, 70.

The dilution passages 116 are located downstream of the forward circumferential rail 122a, 122b in the aft liner panels 72B, 74B to quench the hot combustion gases within the combustion chamber 66 by direct supply of cooling air from the respective annular plenums 76, 78. That is, the dilution passages 116 pass air at the pressure outside the combustion chamber 66 directly into the combustion chamber 66.

This dilution air is not primarily used for cooling of the metal surfaces of the combustor shells or panels, but to condition the combustion products within the combustion chamber 66. In this disclosed non-limiting embodiment, the dilution passages 116 include at least one set of circumferentially alternating major dilution passages 116A and minor dilution passages 116B (also shown in FIG. 6). That is, in some circumferentially offset locations, two major dilution passages 116A are separated by one minor dilution passages 116B. Here, every two major dilution passages 116A are separated by one minor dilution passages 116B but may still be considered "circumferentially alternating" as described herein.

Figure 7:
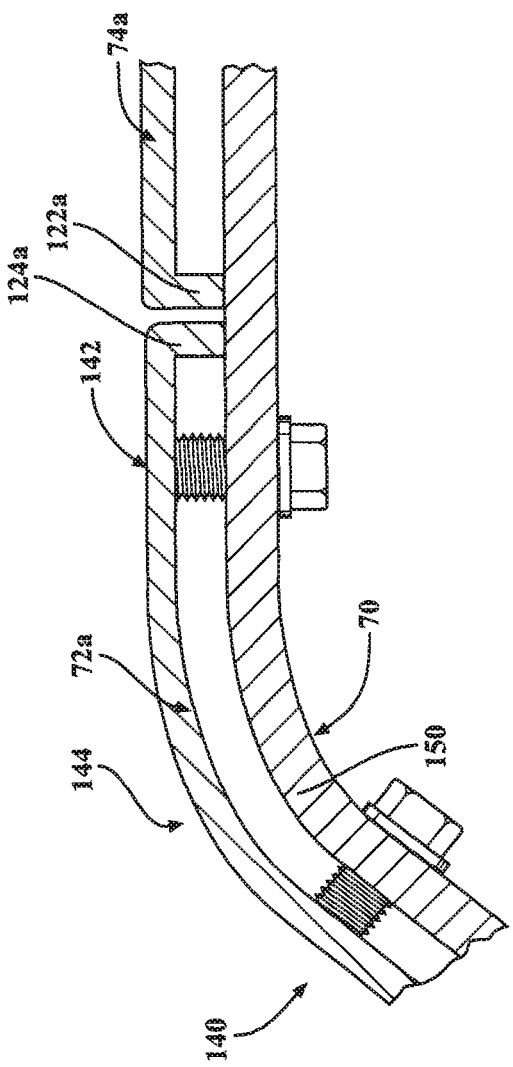
FIG. 7 is a sectional view of a non-linear liner panel.

With reference to FIG. 7, each of the forward liner panels 72A, 72B includes a forward section 140, and an aft section 142 that defines an arcuate surface section 144 therebetween. That is, there is a smooth arcuate transition in the axial profile between the forward section 140 and the aft section 142 of the forward liner panels 72A, 72B profile to form a converging or diverging geometry in the inner flow path of the combustor. Combustor liners with such a gradual radius can eliminate interfaces that may result in steps, dead regions, cooling challenges, and/or adverse local aerodynamics.

In one example, the forward liner panels 72A, 72B includes an arcuate surface section 144 that extends over an angle of about 150 to 175 degrees. The combustor liner extends across two segments of the combustor liner support shell 68, 70 with the arcuate surface section 144 in the region where the combustor liner support shell 68, 70 is formed with a complementary arcuate surface section 150. It should be appreciated that in some embodiments, the complementary arcuate surface section 150 is conventional in that no modification need be performed to the combustor liner support shell 68, 70 to utilize the the forward liner panels 72A, 72B with the arcuate surface section 144. That is, the aft circumferential rail 124a, 124b of the forward liner panel 72A, 72B is adjacent to the forward circumferential rail 122a, 122b of the aft liner panel 74A, 74B downstream of the combustor liner support shell 68, 70.

In this embodiment, the forward liner panel 72A, 72B defines about 60% the length of the combustor and the aft liner panel 74A, 74B defines about 40% the length of the combustor. That is, the forward liner panel 72A, 72B is longer than the aft liner panel 74A, 74B.

The non-linear axial profile of the forward liner panels 72A, 72B increases combustor durability and the ability to optimize the combustor design and performance. Combustor liners with a kink or bend can eliminate interfaces that result in steps, dead regions, cooling challenges and adverse local aerodynamics. Panels of this geometry edges are readily employed in cast and machined panel designs and incorporated in dual wall liners.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A combustor wall assembly for a gas turbine engine comprising:
    a support shell with a complementary arcuate surface section;
    a bulkhead support shell mounted to the support shell;
    a bulkhead assembly mounted to the bulkhead support shell;
    a forward liner panel mounted to the support shell via a multiple of studs downstream of the bulkhead assembly, the forward liner panel including a forward section and an aft section that defines an arcuate surface section adjacent to the complementary arcuate surface section of the support shell in an axial profile of an engine central longitudinal axis surrounded by the combustor between the forward section and the aft section with respect to an inner flow path of the combustor, wherein the arcuate surface section extends over an angle between about 150 to 175 degrees; and an aft liner panel mounted to the support shell via a multiple of studs downstream of the forward liner panel, the aft liner panel planar in the axial profile, separated from the forward liner panel, and directly adjacent to the forward liner panel.

2. The combustor wall assembly as recited in claim 1, further comprising a multiple of circumferentially distributed bulkhead liner panels secured to the bulkhead support shell, the multiple of circumferentially distributed bulkhead liner panels transverse to the forward liner panel and the aft liner panel.

3. A combustor for a gas turbine engine comprising:

an outer combustor wall assembly and an inner combustor wall assembly around an annular combustion chamber that surrounds an engine central longitudinal axis, each of the outer and inner combustor wall assembly comprising:

a combustor liner support shell with an arcuate surface section toward the combustion chamber with respect to the engine central longitudinal axis;

a forward liner panel mounted to the support shell via a multiple of studs, the forward liner panel comprising a forward section and an aft section that defines a complementary arcuate surface section adjacent to the arcuate surface section of the support shell in a profile of the engine central longitudinal axis between the forward section and the aft section with respect to an inner flow path of the combustor;

an aft liner panel mounted to the support shell via a multiple of studs downstream of the forward liner panel the aft liner panel is planar in the axial profile, separated from the forward liner panel, and directly adjacent to the forward liner panel;

a forward assembly attached to the outer combustor wall assembly and the inner combustor wall assembly forward of the forward liner panel, the forward assembly comprising a bulkhead support shell-mounted to the combustor liner support shell and a multiple of circumferentially distributed bulkhead liner panels mounted to the bulkhead support shell, the multiple of circumferentially distributed bulkhead liner panels transverse to the forward liner panel and the aft liner panel; and a multiple of the combustor swirlers mounted at least partially through the bulkhead assembly.

4. The liner panel as recited in claim 3, wherein the arcuate surface section extends over an angle between about 150 to 175 degrees with respect to a cold side of the forward liner panel.

* * * * *